US005562027A

United States Patent [19]

Moore

[11] Patent Number: 5,562,027

[45] Date of Patent: Oct. 8, 1996

[54] DYNAMIC NIP PRESSURE AND TEMPERATURE SENSING SYSTEM

[75] Inventor: Robert H. Moore, Winchester, Va.

[73] Assignee: Stowe Woodward Licensco, Inc., Wilmington, Del.

[21] Appl. No.: 390,408

[22] Filed: Feb. 16, 1995

[51] Int. Cl.[6] .............................. B30B 3/04; G01L 5/00; G01K 13/00

[52] U.S. Cl. .......................... 100/35; 73/862.55; 100/50; 100/99; 100/176; 374/130; 374/153; 492/10

[58] Field of Search ................................ 100/35, 47, 50, 100/99, 153, 162 B, 176; 72/10; 73/862.55, 862.68; 374/130, 153; 492/9, 10, 20

[56] References Cited

U.S. PATENT DOCUMENTS

| | | | |
|---|---|---|---|
| 4,016,756 | 4/1977 | Kunkle . | |
| 4,233,011 | 11/1980 | Bolender et al. | 425/143 |
| 4,445,349 | 5/1984 | Eibe | 100/162 B |
| 4,498,383 | 2/1985 | Pav et al. | 100/162 B |
| 4,509,237 | 4/1985 | Volz et al. | 492/7 |
| 4,729,153 | 3/1988 | Pav et al. | 492/7 |
| 4,898,012 | 2/1990 | Jones et al. | 72/11 |
| 4,903,517 | 2/1990 | Van Haag et al. | 100/47 |
| 5,048,353 | 9/1991 | Justus | 73/862.55 |
| 5,086,220 | 2/1992 | Berthold et al. | 374/130 |
| 5,379,652 | 1/1995 | Allonen | 73/862.55 |
| 5,383,371 | 1/1995 | Laitinen | 73/862.55 |

FOREIGN PATENT DOCUMENTS

| | | | |
|---|---|---|---|
| 863133 | 1/1953 | Germany | 374/153 |

OTHER PUBLICATIONS

A Study of Rubber Covered Press Nip Dynamics, James P. McNamee The Journal of the Technical Association of the Pulp and Paper Industry, vol. 48, No. 12, Dec. 1965, pp. 673–679.

Experimental Investigation of Rolling Contact, Aris C. Spengos Journal of Applied Mechanics, Dec. 1965, pp. 859–864.

Measurements of pressure distribution between metal and rubber covered rollers, G. J. Parish, British Journal of Applied Pyhsics, vol. 9, Apr. 1958, pp. 158–161.

Soft Calendar Nip: an interesting subject for research and Measurement, J. Koriseva et al., Paper and Timber, 73(1991):5 pp. 419–423.

Embedded Strain Gages for the Measurement of Strains in Rolling Contact, A. Bazergui and M. L. Meyer, Experimental Mechanics, Oct. 1968, pp. 433–441.

Transducers and Techniques of Contact Pressure Measurement, Terry L. Merriman, The Society for Experimental Mechanics, Spring Conference, Jun. 1991, pp. 318–320.

Measurement of the Pressure–Time Profile in a Rolling Calendar Nip, Samuel F. Keller, 77th Annual Meeting of the Canadian Section of the Pulp and Paper Assn., 1991, pp. B89–B96.

*Primary Examiner*—Stephen F. Gerrity
*Attorney, Agent, or Firm*—Lorusso & Loud

[57] ABSTRACT

A system for measuring the dynamic pressure distribution between rolls in a nip roll press comprises a roll adapted to rotatingly contact at least one other roll in a press nip, having one or more sensors thereon, for measuring the nip pressure at several locations along the roll length, wherein the measurements obtained by the sensors are transmitted to a computer and a display, to provide tabular, numerical and graphical representations of the pressure at one or more locations on the roll. Optionally a control system may be incorporated in the system for determining the pressure distribution along the roll and initiating corrective measures. The system of the instant invention can further measure temperature variations, if desired, as thermal sensors can be used on the sensing roll, or a computerized correlation scheme can relate sensor readings to temperature as well as pressure.

27 Claims, 9 Drawing Sheets

DYNAMIC NIP PRESSURE AND TEMPERATURE SENSING SYSTEM

FIELD OF THE INVENTION

This invention relates to a roll for use in the press-nip section of a papermaking or related machine, such roll having sensors for determining pressure or temperature across the length of the roll.

BACKGROUND OF THE INVENTION

In the process of papermaking, many stages are required to transform headbox stock into paper. The initial stage is the deposition of the headbox stock onto paper machine clothing or fabric. Upon deposition, the white water forming a part of the stock, flows through the interstices of the fabric, leaving a mixture of water and fiber thereon. The fabric then supports the mixture, leading it through several dewatering stages such that only a fibrous web or matt is left thereon.

One of the stages of dewatering takes place in the nip press section of the papermaking process. In the nip press section, two or more cooperating rolls press the fibrous web as it travels on the fabric between the rolls. The rolls, in exerting a great force on the fabric, cause the web traveling thereon to become flattened, thereby achieving a damp fibrous matt. The damp matt is then led through several vacuum and dewatering stages.

The amount of pressure applied to the web during the nip press stage is important in achieving uniform sheet characteristics. Variations in nip pressure can affect the sheet moisture content and sheet properties. Excessive pressure can cause crushing of the fibers as well as holes in the resulting paper product. Conventional methods to solve this problem have been unsuccessful, and as such this problem persists in the nip press stage, often resulting in paper of poor quality having uneven surface characteristics.

Roll deflection, commonly due to sag or nip loading, has been a source of uneven pressure distribution. To compensate for such deflection, rolls have been developed which monitor and alter the roll crown. Such rolls usually have a floating shell which surrounds a stationary core. Underneath the floating shell are pressure regulators which detect pressure differentials and provide increased pressure to the floating shell when necessary.

One such roll is described in U.S. Pat. No. 4,509,237. This roll has position sensors to determine an uneven disposition of the roll shell. The signals from the sensors activate support or pressure elements underneath the roll shell, thereby equalizing any uneven positioning that may exist due to pressure variations. The pressure elements comprise conventional hydrostatic support bearings which are supplied by a pressurized oil infeed line. A similar roll is disclosed in U.S. Pat. No. 4,729,153. This controlled deflection roll further has sensors for regulating roll surface temperature in a narrow band across the roll face. Other controlled deflection rolls such as the one described in U.S. Pat. No. 4,233,011 rely on the thermal expansion properties of the roll material, to achieve proper roll flexure. Such deflection compensated rolls are effective in varying the crown. Thus, such rolls can operate as effectively at a loading of 100 pounds per inch as at 500 pounds per inch, whereas rolls without such capabilities can only operate correctly at a single specific loading.

Although the prior art has addressed the problem of measuring roll deflection, the prior art is silent as to methods of measuring the loading across the roll face while the roll is in operation. Loading is the force which the roll applies in a press nip, to a fibrous web. As stated above, often the amount of pressure is unevenly applied. For example, if roll loading is set to 200 pounds per inch, it may actually be 300 pounds per inch at the edges and 100 pounds per inch at the center.

Conventional methods of determining the presence of such discrepancies in applied pressure requires stopping the roll and placing a long piece of carbon paper, foil, or pressure sensitive film in the nip. This procedure is known as taking a nip impression. While this procedure is useful, it cannot be used while the nip press is in operation. Furthermore, such methods are not reusable as they measure only a single event such as the highest pressure or contact width. Additionally, such readings, to be useful must be repeatedly obtained, and averaged, a process which results in increased down time for unloading and reloading of the paper. Lastly, temperature and other related changes which would affect the uniformity of nip pressure, cannot be taken into account.

The roll described in U.S. Pat. No. 4,898,012 has attempted to address this problem by incorporating sensors on the roll to determine the gauge profile of a press nip. However, there are a number of problems inherent to this roll. The construction of this roll requires a stationary center beam, and as such, would not be adapted to all types of rolls, but only rolls having a floating roll shell, such as controlled deflection rolls. Therefore, the approach could not be implemented on existing non-controlled deflection rolls. The technique would require significant calibration since the measurements are based upon the deflection of the floating shell inside diameter and not the actual nip load.

Conventional roll-systems in the prior art have failed to provide measurements of pressure variations therealong while the roll is rotating in a press nip. The instant invention measures such variations and provides the operator with instantaneous knowledge of such pressure variations, thereby enabling the operator to diagnose irregularities in the pressure applied to the web, and initiate corrective measures without delay.

SUMMARY OF THE INVENTION

It is an object of the invention to ensure uniform sheet quality and characteristics across the machine width.

It is another object of the invention to measure pressure at various locations along the roll.

It is another object of the invention to display the dynamic pressure profile of the roll.

It is a further object of the invention to determine pressure at any given location on the roll.

It is yet another object of the invention to translate measured pressure values into crown correction data.

It is yet another object of the invention to initiate corrective measures to provide uniformity in load pressure.

It is still another object of the invention to provide a method for determining the pressure profile along the roll.

These and other objects of the invention are achieved by a system for measuring the dynamic pressure distribution between rolls in a nip roll press. The system comprises a roll adapted to rotatingly contact at least one other roll in at least one press nip, having one or more sensors thereon, for measuring the nip pressure at several locations along the roll length, wherein the measurements obtained by the sensors are transmitted to a computer and a display to provide numerical as well as graphical representations of the pressure at one or more locations on the roll. Optionally a control system may be incorporated in the system for determining the pressure distribution along the roll and initiating corrective measures. The system of the instant invention can further measure temperature variations, if desired, as thermal sensors can be used on the sensing roll, or the computerized correlation scheme can relate sensor readings to temperature as well as pressure. The discussion to follow, however, will focus primarily on the system's ability to measure pressure variations along the length of the roll.

DETAILED DESCRIPTION OF THE INVENTION

Figure 1:
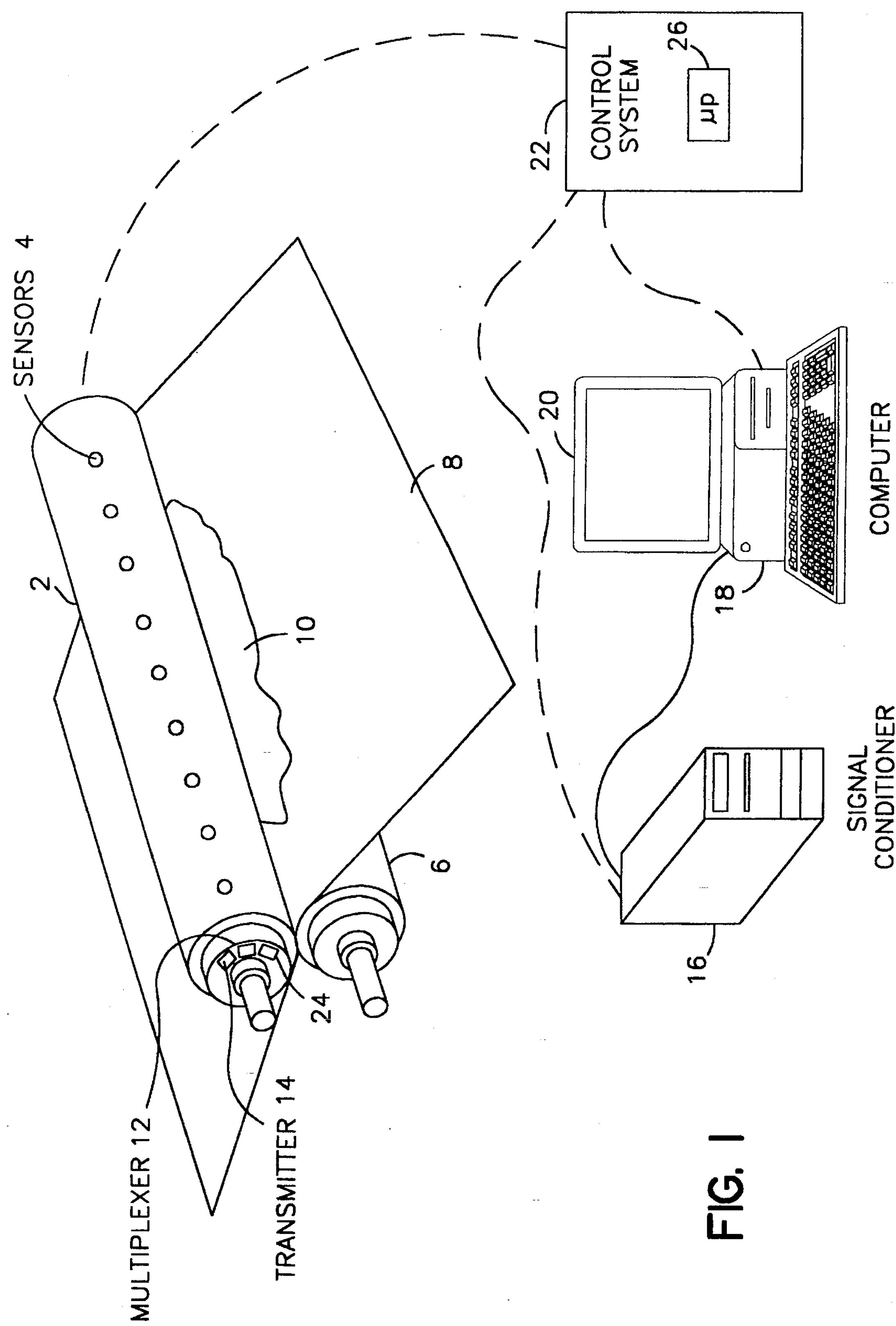
FIG. 1 shows a plan view of the system of the instant invention.

FIG. 1 shows a plan view of the system 1 of the instant invention. Roll 2 having pressure sensors thereon 4, lies in a press nip configuration with another roll 6. Fabric 8 carrying a web 10 of fibrous matter, lies between the two rolls, 2 and 6, causing the web to be compressed therebetween.

In electrical communication with the sensors 4 are associated electronics 24, which aid in converting the sensor output to a pressure value. A roll-mounted multiplexer 12 is accessed by the computer 18, to cycle through the sensors 4 to obtain output signals indicative of the pressure sensed. The multiplexer 12 is further in electrical communication with a bidirectional transmitter 14 which can comprise a telemetry transmitter, slip rings or a rotary transformer. The transmitter 14 transmits the signals from the multiplexer 12 to a signal conditioner 16 which in turn, delivers conditioned signals representing the pressure sensed, to the computer 18. A preferred telemetry transmitter is manufactured by Microstrain of Burlington, Vt. This telemetry transmitter has a single channel FM bridge transmitted that can be switched on and off remotely, to conserve power. Such a feature is important for non crown-controlled rolls, where sensing pressure distributions at all times is not desired. An alternative transmitter is manufactured by Physical Measurement Devices of Melbourne, Fla. Model PAM-15 incorporates 15channels over one radio link.

The computer 18 has a microprocessor for accessing the multiplexed channel results at predetermined or requested times. Requested transmissions are achieved by operator input through the keyboard of the computer. There are many ways to establish which channel is being sent, for example, a two-way telemetry system or two-way slip ring could control the multiplexer. Alternatively, a trigger could be used to start multiplexing at a predetermined delay rate set by the computer 18. Another alternative is to have the multiplexer send out a skipped channel or signal to signify the current status. Alternatively, one channel of the multiplexer could have a fingerprint, such as a grounded or open signal. Also, a repetitive sequence could be used, such that the starting point would be easy to detect, for example a signal burst. Should optical fiber sensors be used, such as a Bragg grating, intrinsic Fabry-Perot sensors, extrinsic Fabry-Perot sensors, or in-line fiber etalon sensors, the output light signals can be multiplexed on the same optical fiber. The resulting output would entail a number of discrete phase shifts, at different frequencies equivalent to the number of sensors.

Once the computer 18 has received the signals from the sensors and computed a pressure value, display 20 can indicate the pressure numerically, graphically or in any other desired manner depending upon the operator's needs. Cross machine pressure profiles, as well as through the nip profiles can be displayed. The computer 18 can further convert the pressure measurements to nip widths as well as data for crown correction.

An optional control system 22, can be connected to the computer 18 and the signal conditioner 16. Control system 22 serves to correct any sensed pressure irregularities by increasing or decreasing the force being applied by the roll. The control system 22 has an internal microprocessor 26 for receiving user inputs in response to interpretation of pressure sensed, or for receiving direct pressure readings from the signal conditioner. The microprocessor 26 upon receipt of such signals initiates corrective measures to make adjustments to the journal forces applied between rolls 2 and 6, or to the zone pressures or crown settings when the system is used as part of a controlled crown feedback system.

Figure 2A:
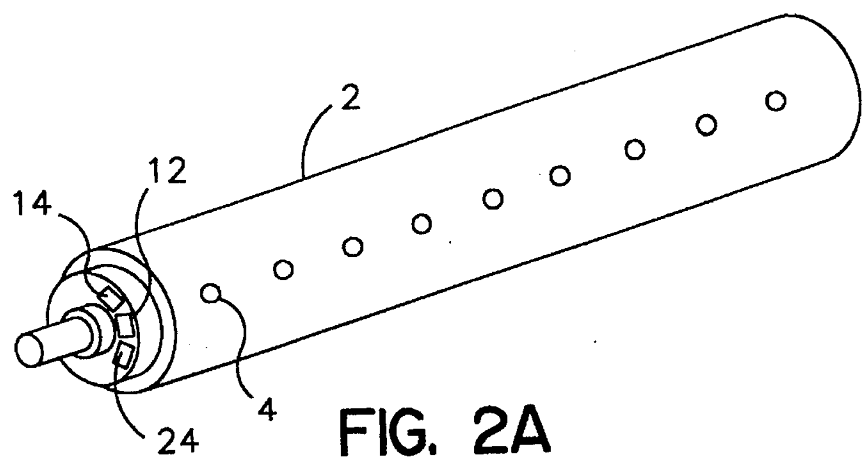
FIG. 2A shows a preferred embodiment of the roll of the instant invention having sensors at uniformly spaced locations along the roll.
Figure 2B:
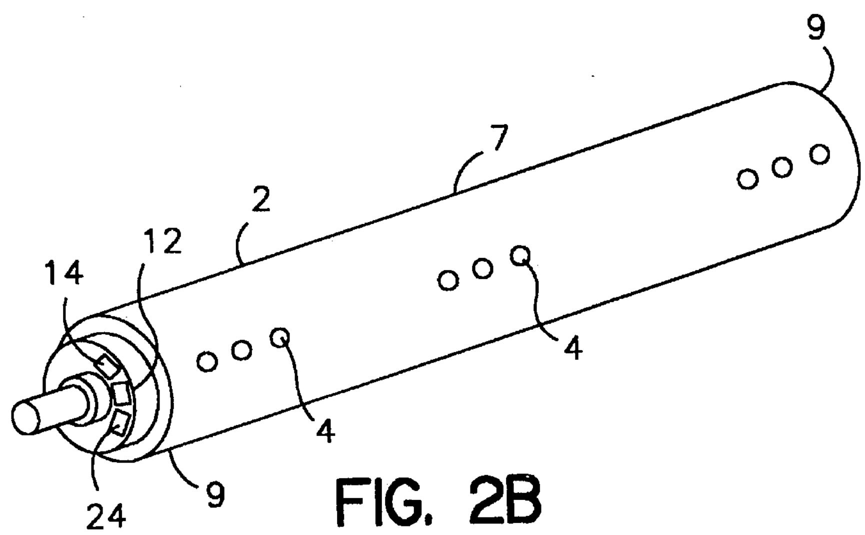
FIG. 2B shows an alternative embodiment of the roll of the instant invention having sensors at spaced locations at the middle and at the ends of the roll.
Figure 2C:
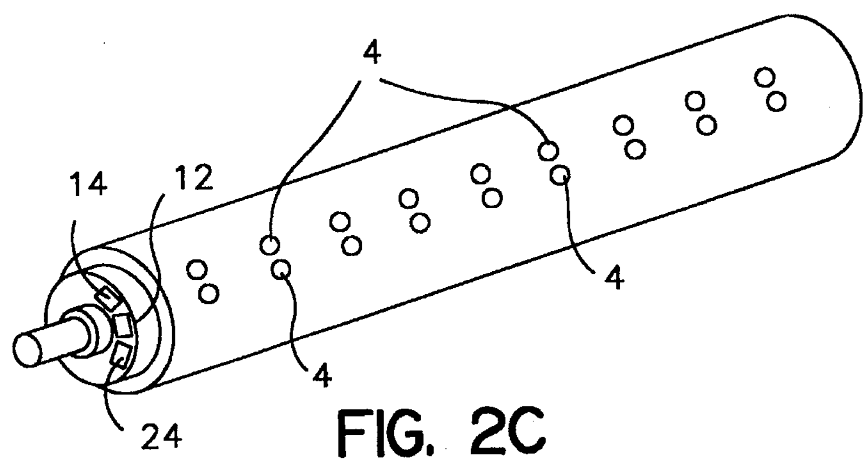
FIG. 2C shows an alternative embodiment of the roll of the instant invention having two rows of sensors disposed at the same axial location, but at a different circumferential location on the roll.

FIG. 2A shows a preferred embodiment of the roll 2 of the instant invention having sensors 4 at uniformly spaced locations along the roll 2. Note that the sensors 4 are spaced uniformly across the roll. This spacing is in accordance with the usual practice for crown correction measurements. Although the sensors 4 are shown linearly across the roll 2, this is not essential, as the sensors could be non-uniformly scattered or appear in a spiral formation around the roll. Note that the invention is not to be limited to the sensor configurations discussed herein, as the placement of the sensors on the roll can appear in other configurations as well. Further, the sensors can be disposed as shown in FIG. 2B. Such a configuration is desirable should the operator wish to emphasize detection of pressure in certain regions of the roll. For example, often the force exhibited by the roll is greater at the ends of the roll than at the middle of the roll. In light of this tendency, the sensors may advantageously be disposed in clusters at the middle 7 of the roll 2 as well as at the ends 9 of the roll 2 as shown in FIG. 2B. Additionally, the sensors can be spaced at the same axial location along the roll, but at a different circumferential location on the roll, as shown in FIG. 2C. By employing the roll of this configuration in the system of the instant invention, only one of the circumferentially disposed sensors will be in the nip at a given time. Given that many sensors are sensitive to effects, measurements often reflect changes in temperature and other effects. This problem is alleviated if two circumferentially disposed sensors at various locations are used, as shown in FIG. 2C, the outputs from the sensors can be configured into a bridge circuit such that the external conditions can be subtracted therefrom, such that the sensors would be measuring the effect of nip pressure in and out of the nip. Subtraction could be performed digitally also. Furthermore, in a single sensor system, the sensor signal outside the nip may be subtracted from the signal inside the nip.

Figure 2D:
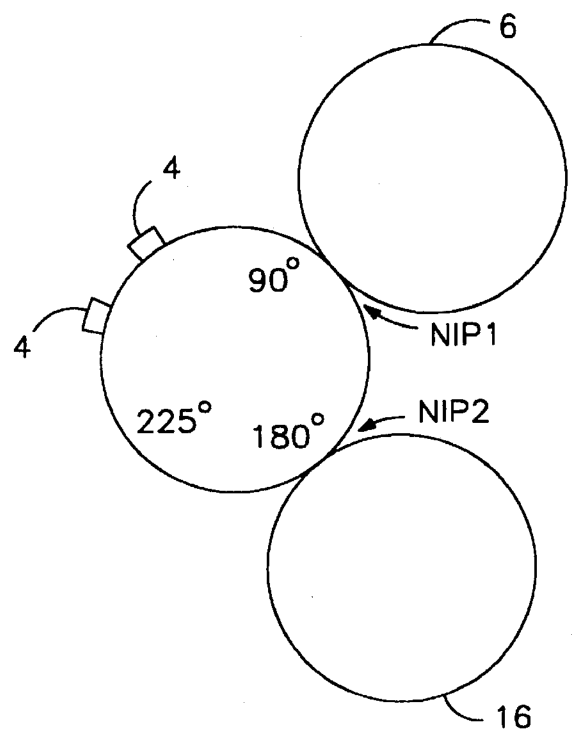
FIG. 2D shows a side view of an alternative embodiment of the roll of the instant invention, having multiple sensors disposed at the same axial location, but at a different circumferential locations on the roll, used in forming more than one press nip.

The sensor configurations would also work for multiple nip conditions. Each sensor would pass through each nip during each rotation, as shown in FIG. 2D. Multiple sensors could be used in multiple nip configurations as well. The sensors would be placed such that only one nip pressure was read at one time. If multiple simultaneous readings were desired, the sensors would be placed at angles that correspond to the angles of the various nips. The compensation gauges could also be offset.

Similarly, as shown in FIG. 2D, the sensors 4 can be disposed 30° away from each other on the roll. Such a roll 2 having sensors 4 so disposed is useful when the roll 2 is configured with other rolls 6, 16 to form two press-nips, as multiple pressure readings can be obtained simultaneously at the different angular locations. This is further discussed with respect to FIG. 6C.

Figure 2E:
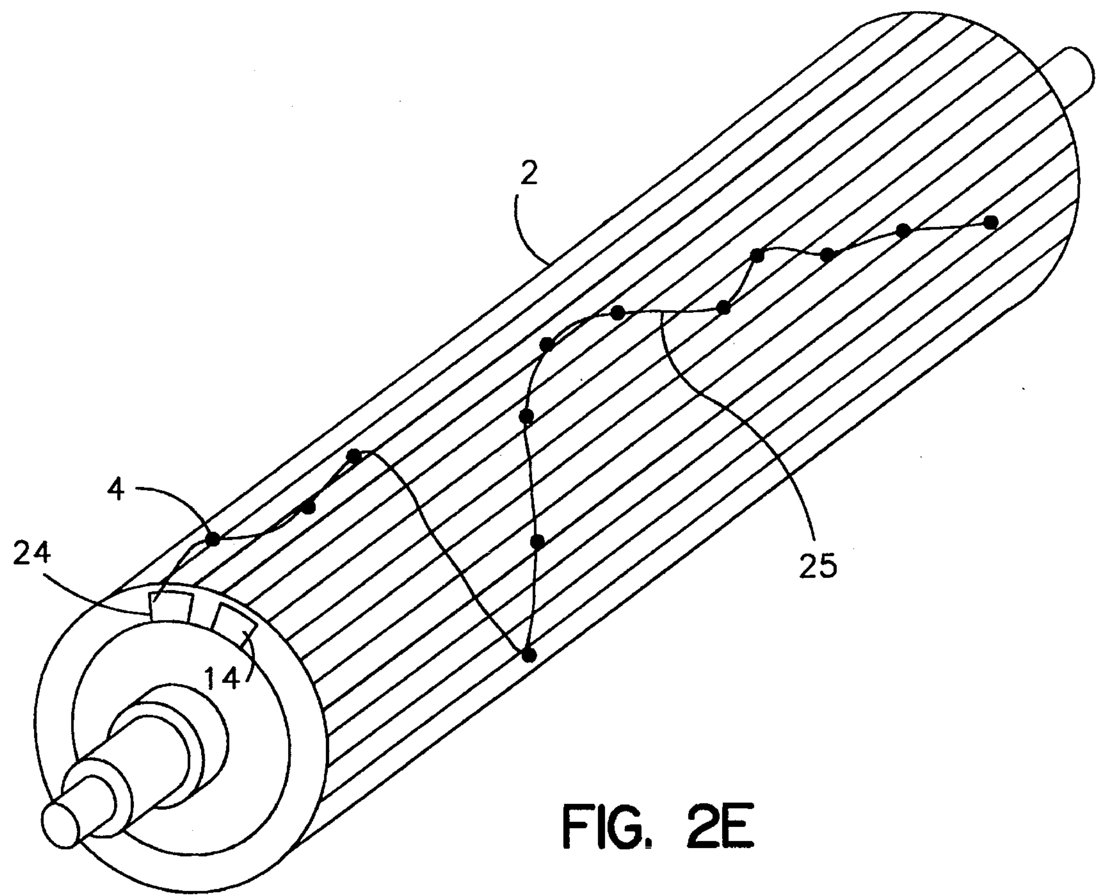
FIG. 2E shows an alternate embodiment of the roll of the instant invention having sensors at scattered circumferential and axial locations.

FIG. 2E, depicts an alternate embodiment of the roll 2 of the instant invention having sensors 4 at scattered circumferential and axial locations. The sensors could be electrically connected by connector 25 and spatially configured such that only one sensor enters a nip at one instant. Thus, during a single revolution, the nip pressure at each axial location would be sensed individually and there would be no need for a multiplexer. Such an arrangement would provide cross-machine direction loading profiles in addition to nip profiles in the machine direction at each axial location. Multiple sets of scattered and connected sensors could also be used.

Figure 3A:
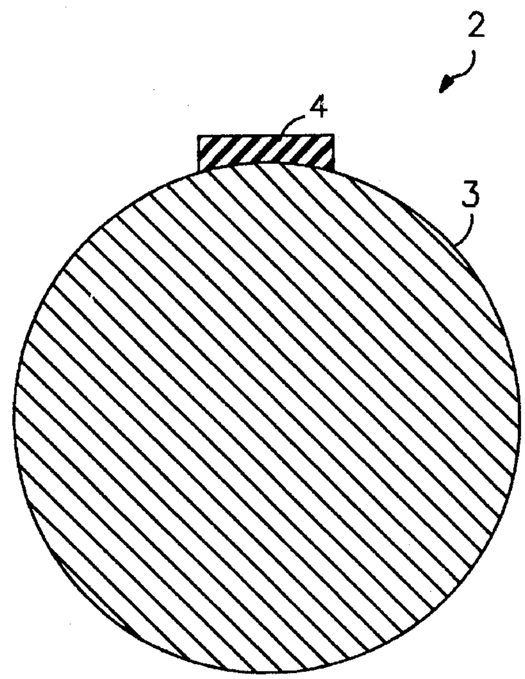
FIG. 3A shows sensors mounted on-the roll surface.
Figure 3B:
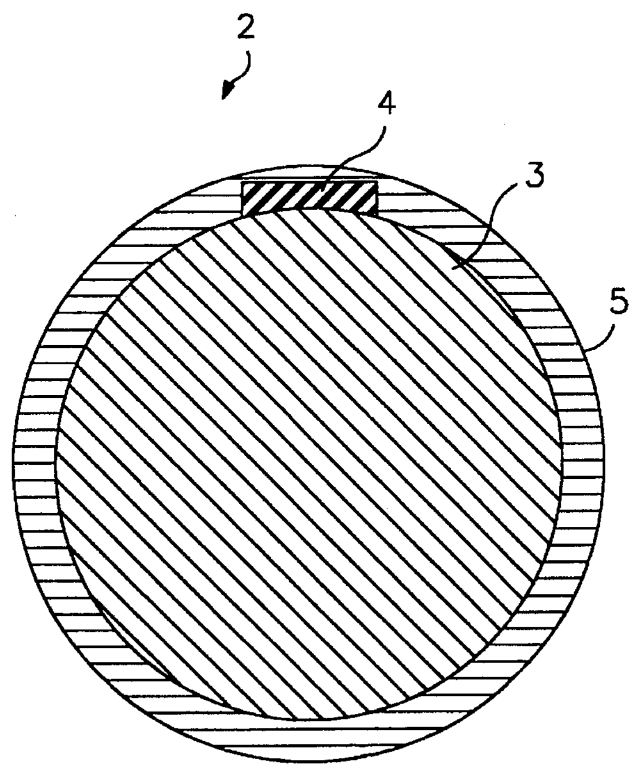
FIG. 3B shows sensors mounted underneath a roll cover.

With respect to the sensor configurations shown in FIGS. 2A–2D, the mounting of such sensors is shown in FIGS. 3A and 3B. The sensors 4 can be mounted at the roll surface 3 as shown in FIG. 3A. Additionally, given the fact that rolls are often comprised of multiple layers, the sensors 4 can be embedded within a roll cover 5 as shown in FIG. 3B. Note that depending on the number of layers, the sensors may be embedded at any radial position between multiple inner layers of a roll.

The sensors 4, in each of the above FIGS. 2A, 2B, 2C can be piezoelectric, piezoresistive, strain gage, or fiber optic sensors, to name a few. Additional sensor configurations specific to optical fibers are discussed below with respect to FIGS. 4A and 4B. With respect to the above-described sensors, the electronics 24 on the roll 2, for aiding in converting the sensor output to a pressure value, depends on the type of sensor used. Thus, if piezoelectric or piezoresistive sensors are used, electronics 24, would comprise charge coupled amplifiers. If strain gage sensors are used, electronics 24, would comprise wheatstone bridges. If optical fiber sensors are used, electronics 24, would comprise an optical phase modulator.

In the case of piezoelectric or piezoresistive sensors, such sensors are preferably constructed of thin films and placed on or in the roll such that radial pressure is measured. Often the temperature limitations of such sensors preclude the embedded application of FIG. 2C. Alternatively, sensors comprising strain gages can be used to sense pressure along the roll. When using strain gage sensors, an indirect measurement of radial pressure is obtained, which is interpreted in the computer 18. Alternatively, fiber optic sensors can be used, as such sensors are useful in measuring strain in any direction. With respect to measuring hoop strain, Bragg grating, intrinsic Fabry-Perot sensors, extrinsic Fabry-Perot sensors and in-line fiber etalon sensors can be used. These sensors are able to resolve temperature effects, are absolute and are not lead sensitive. Furthermore, such sensors can be hermetically sealed to resist moisture degradation, thus prolonging the life thereof. Additionally, these sensors are commonly small in size, and as such will not change the strain field appreciably, as the small size prevents the creation of large damage initiation sites.

Figure 4A:
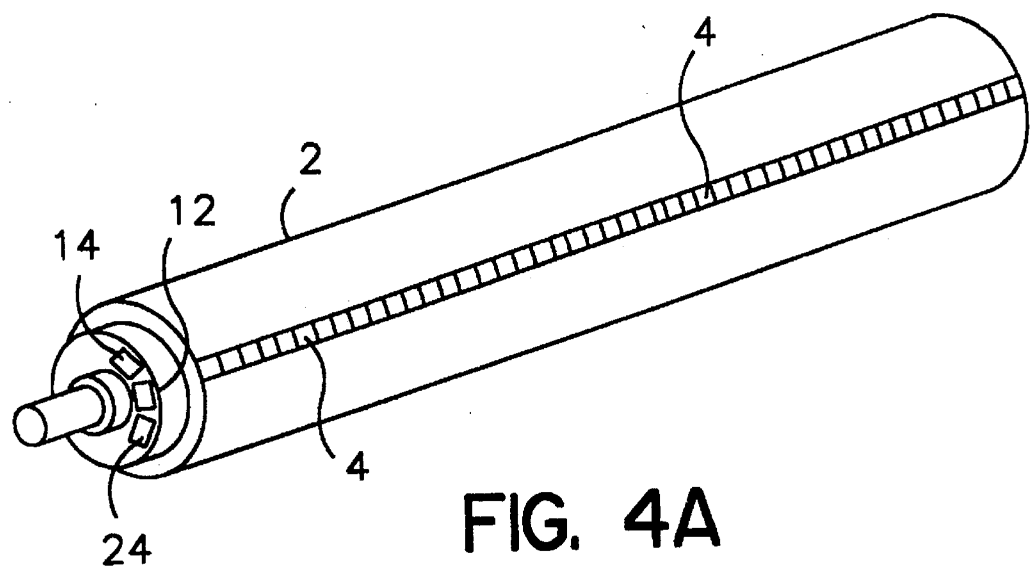
FIG. 4A shows an embodiment of the roll of the instant invention employing fiber optic sensors.
Figure 4B:
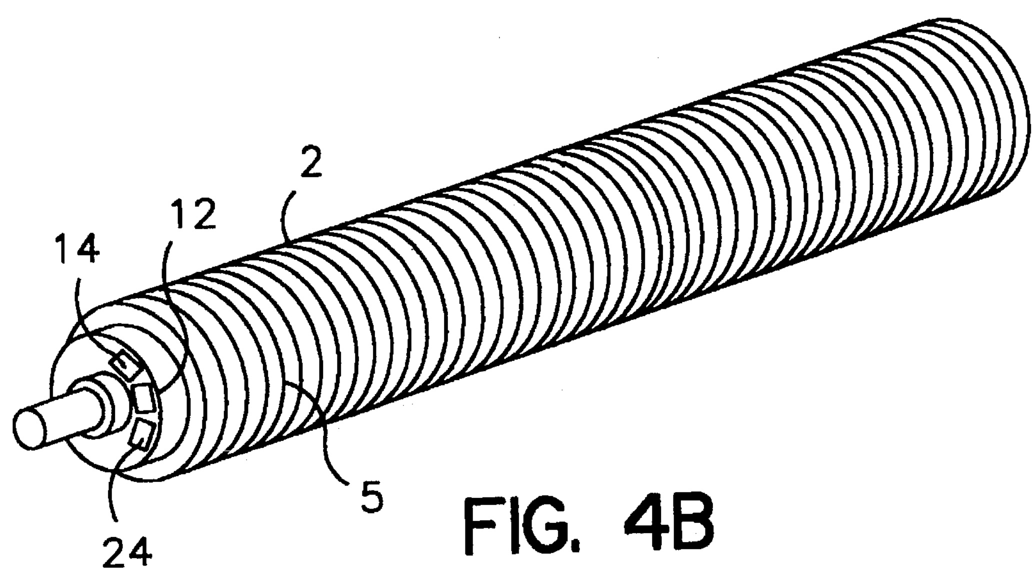
FIG. 4B shows an alternative embodiment of the roll of the instant invention employing fiber optic sensors.

Other sensor configurations are shown in FIGS. 4A and 4B, the sensors in such figures particularly employ fiber optics. Although fiber optic sensors could be arranged in several orientations (i.e. spirals, waves, scattered, straight lines, etc.), the preferred embodiment of FIG. 4A shows an optical fiber mounted along the entire length of the roll, parallel to the roll axis. This configuration enables measurement of the axial deformation of the fiber in response to pressure. The light waves traveling through the optical fiber undergo deflection and reflection, which can provide an indication of pressure in the computer 18 through the use time-domain reflectometry.

Figure 4C:
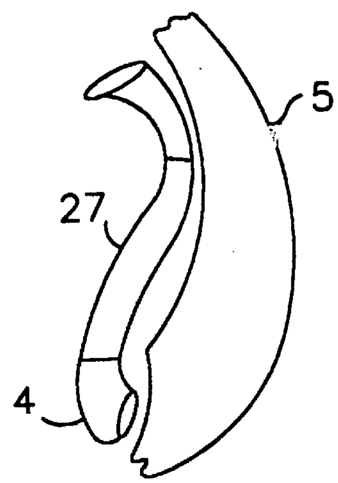
FIG. 4C shows a detailed view of the configuration of FIG. 4B and shows an optical fiber's gage region aligned with the wrap angle for rubber covers.

FIG. 4B shows another optical fiber configuration on the roll. In this figure, fiber optical cable 4 is wrapped around the roll, with rubber covers 5 wrapped in alignment therewith. FIG. 4C, is a more detailed view of the configuration of FIG. 4B and shows an optical fiber's gage region aligned with the wrap angle for rubber covers 5. The angular strain can be measured with this configuration, as opposed to the radial pressure, with the strain readings later configured in the computer 18 to determine cross machine pressure variations.

Figure 4D:
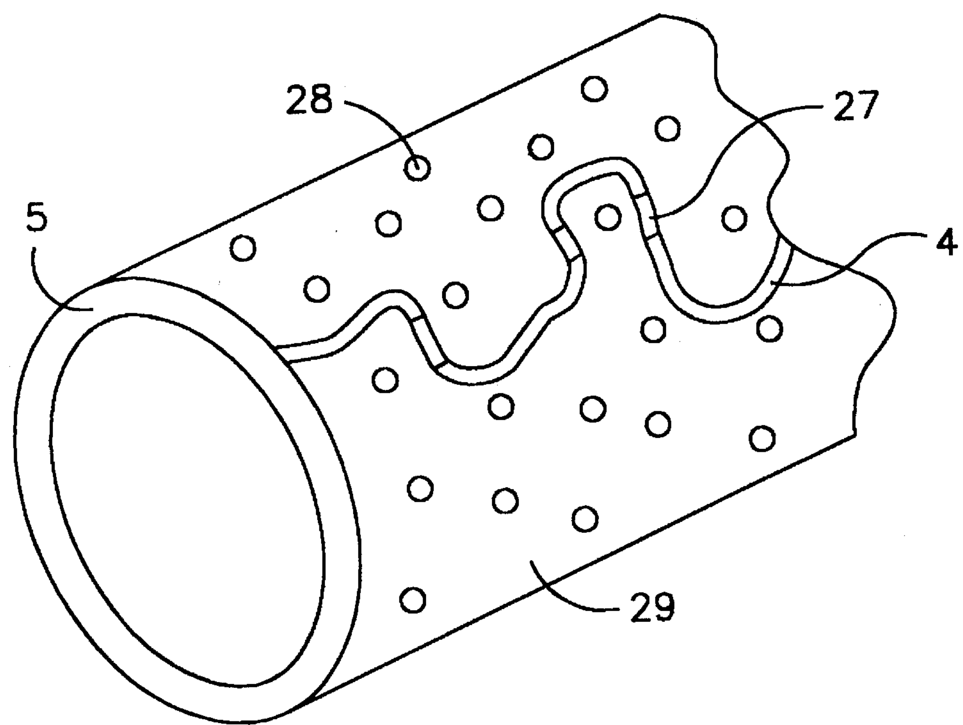
FIG. 4D shows an alternative mounting of the optical sensor.

FIG. 4D shows an alternative mounting of the optical sensors. Sensors 4 can be mounted on suction rolls 29 at places away from the openings 28 in the cover 5, and optical fibers 4 having gauge regions 27 can be routed between the holes.

Figure 5A:
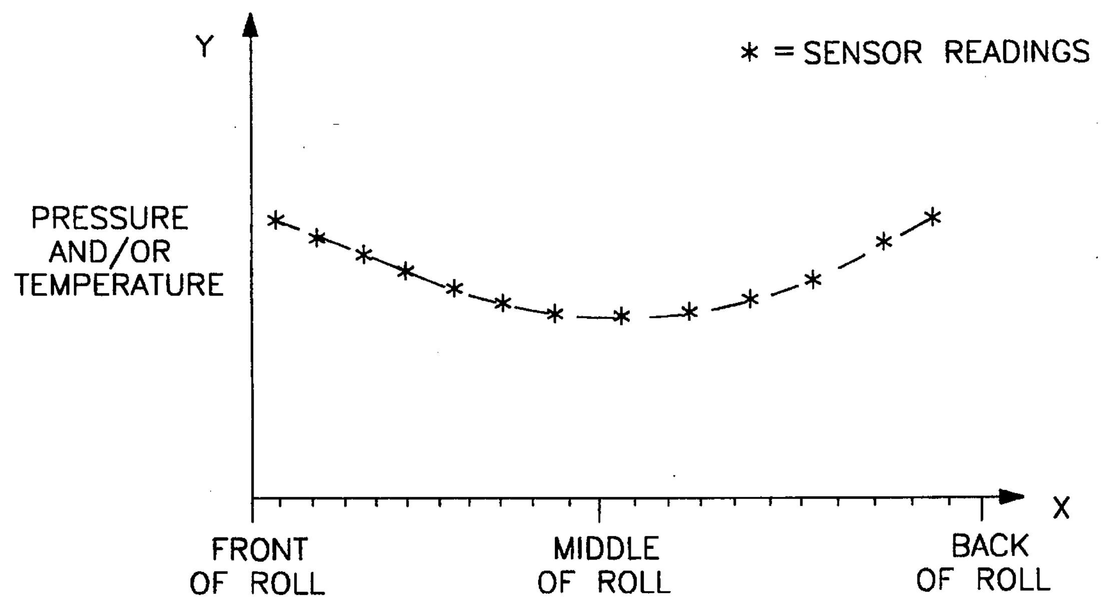
FIG. 5A shows a graphical representation of the pressure sensed along the length of the roll of FIGS. 2A, 2C, and 2E, in terms of location on the roll versus pressure sensed.
Figure 5B:
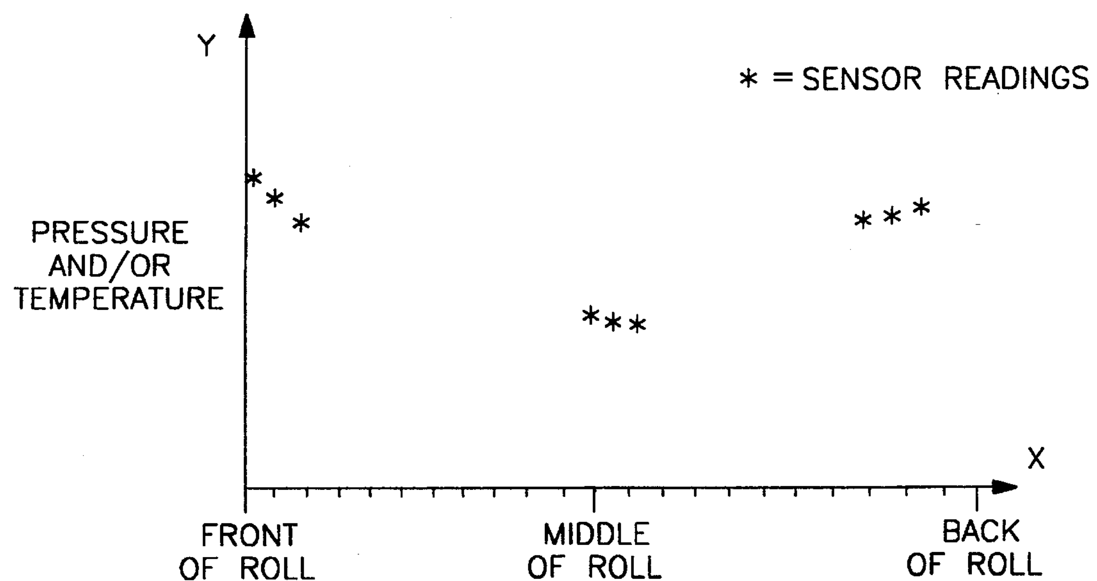
FIG. 5B shows a graphical representation of the pressure sensed along the length of the roll of FIG. 2B in terms of location on the roll versus pressure sensed.

FIG. 5A shows a graphical representation of the pressure sensed along the length of the roll in terms of location on the roll, set forth on the x-axis versus pressure and/or temperature sensed, set forth on the y-axis. This graph represents an output obtained from the roll of FIGS. 2A, 2C,and 2E as the pressure is sensed uniformly along the entire length of the roll. Similarly, FIG. 5B represents the pressure sensed along the length of the roll, however this graph represents an output obtained from the roll of FIG. 2B, as the pressure is sensed at the middle and at the ends of the roll.

Figure 6A:
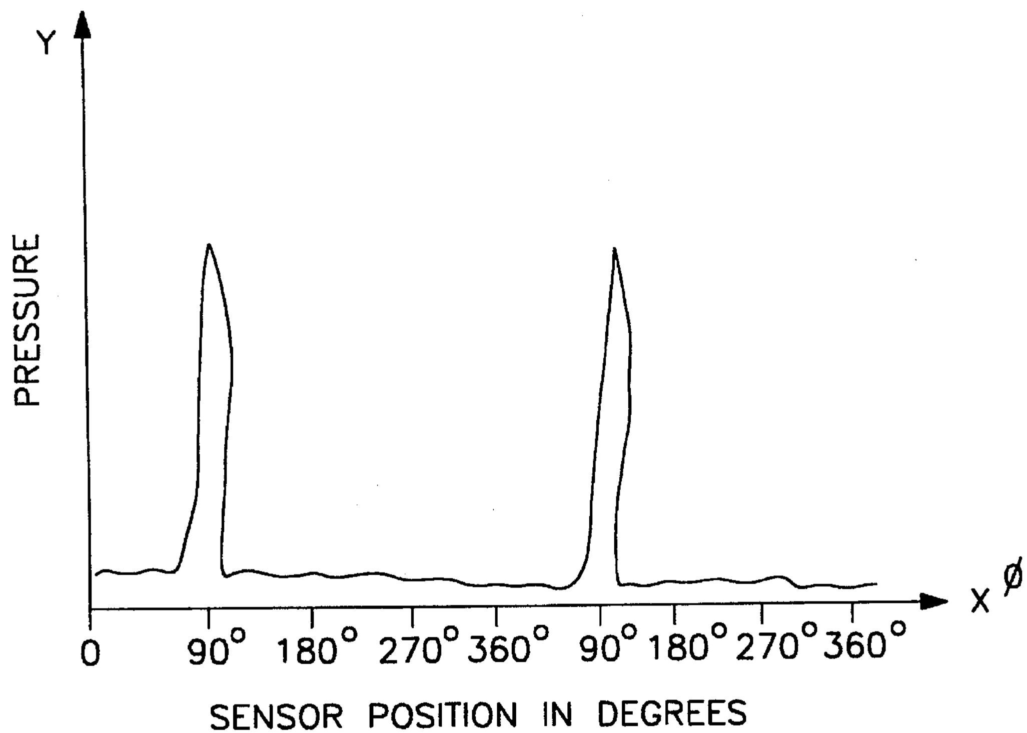
FIG. 6A shows a graphical representation of the pressure sensed at each position along the length of the roll of FIGS. 2A and 2B in terms of the angular position of the sensor.
Figure 6B:
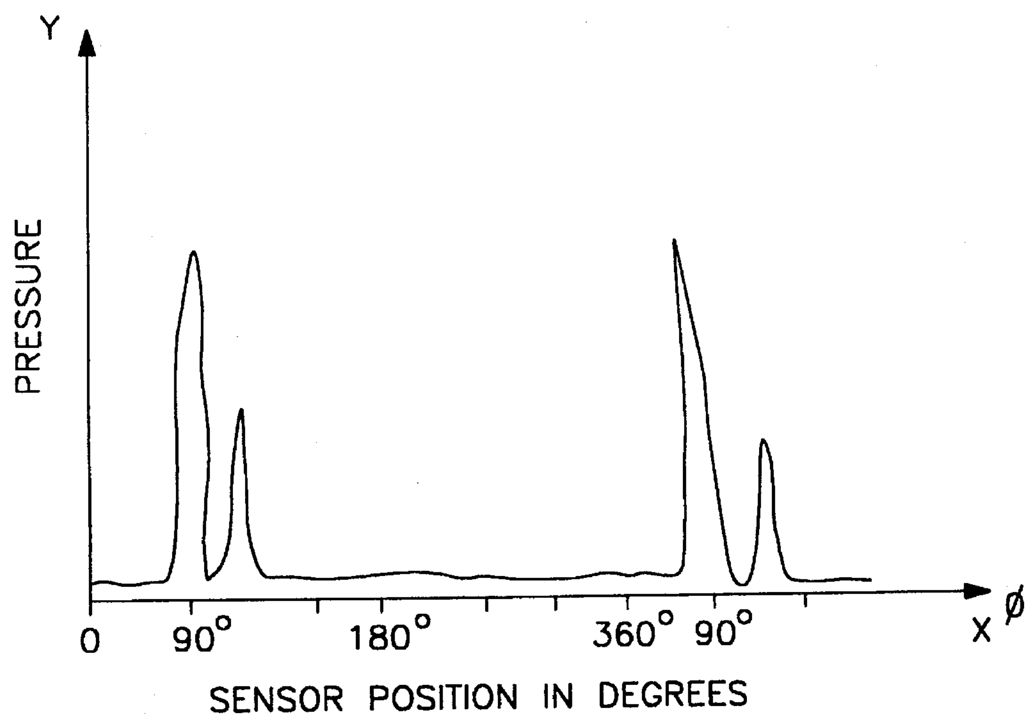
FIG. 6B shows a graphical representation of the pressure sensed along the length of the roll of FIG. 2C in terms of the angular position of the sensor.
Figure 6C:
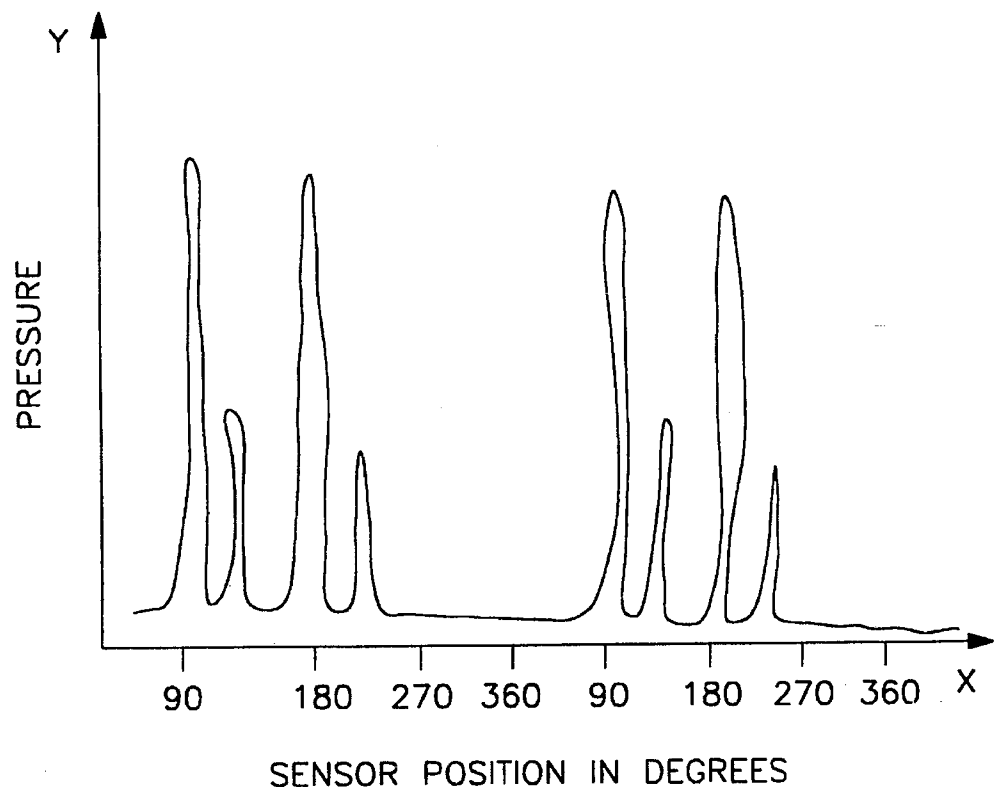
FIG. 6C shows a graphical representation of the pressure sensed along the length of the roll of FIG. 2D in terms of the position of the sensors.

FIG. 6A shows a graphical representation of the pressure sensed along the length of the roll in terms of sensor position with respect to the roll configuration of FIGS. 2A and 2B. Note that as the sensors are each placed linearly along the roll, readings are obtained at one angular position of the roll's rotation, shown in this figure at 90° FIG. 6B shows a graphical representation of the pressure sensed along the same axial location along the roll, but at a different circumferential location on the roll, as shown in the roll of FIG. 2C. Thus, pressure readings are obtained at 90° and 270°. With respect to FIG. 6C, when the roll 2 of FIG. 2D, that being the roll configured with two sensors separated by 30 angular degrees, is configured with other rolls 6, 16 to form two press nips, multiple nip pressure readings can be obtained during one revolution of the instrumented roll. Of course, different separation angles may be used, including angles which would allow both nips to be sensed simultaneously. Thus, a pressure reading from press nip 1 as well as a pressure reading from press nip 2 are displayed at different angular locations so that the operator can monitor both nips at the same time.

Figure 6D:
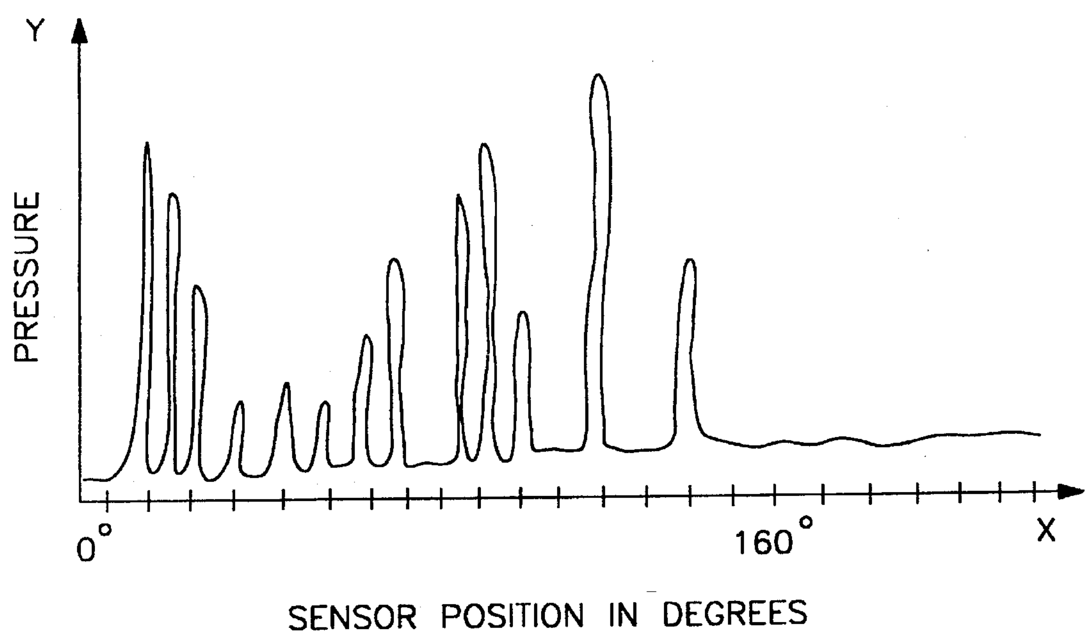
FIG. 6D shows a graphical representation of the pressure sensed along the length of the roll of FIG. 2E in terms of the position of the sensors.

With respect to FIG. 6D, when the roll of FIG. 2E, that being the roll configured with one connected set of scattered sensors, is configured with another roll to form a press nip, multiple pressure readings are obtained during one revolution. Thus, a pressure reading as shown in FIG. 6D would result. The spatial location of the scattered sensors would be known by the computer software and cross-machine pressure profiles such as the one shown in FIG. 5A would result.

Turning again to FIG. 1, the general operation of the invention is as follows. Rolls 2 and 6, disposed in a press nip configuration, rotatingly squeeze web 10 of fibrous matter therebetween. At a predetermined time or at an operator-requested time, the computer 18 communicates with the bidirectional transmitter 14, which communicates with the multiplexer 12. The multiplexer 12 then cycles through the sensors 4, obtaining signals through the associated electronics 24, which signals are indicative of the pressure being sensed by the sensors 4. The multiplexer 12 then communicates with the transmitter 14 to send the signals to the signal conditioner 16 for delivery back to the computer 18 where the determination of the pressure values takes place. The computer 18 then causes a numeric or graphical output to appear on the display 20, alerting the operator of the pressure distribution in the dynamic nip press. Optionally, the computer 18 and or transmitter 14 can communicate pressure related signals to the control system 22. In response to such signals, the control system 22 can then initiate crown correction to remedy any irregularities in the pressure sensed.

The system of the instant invention provides the operator with the ability to determine the pressure profile of a roll in one or more nips so as to diagnose the presence of unevenly applied roll forces. The various graphical representations enable the operator to immediately determine the pressure being applied, the location on the roll, and whether or not it is abnormal. Additionally, the system of the instant invention provides for corrective measures to be initiated in response to such unevenly applied forces.

While the invention has been particularly shown and described with reference to the aforementioned embodiments, it will be understood by those skilled in the art that various changes in form and detail may be made therein without departing from the spirit and scope of the invention. Thus, any modification of the shape, configuration and composition of the elements comprising the invention is within the scope of the present invention. It is to be further understood that the instant invention is by no means limited to the particular constructions or procedures herein disclosed and/or shown in the drawings, but also comprises any modifications or equivalents within the scope of the claims.

What is claimed is:

1. A system for determining the temperature profile in a press nip comprising:

a first roll configured to form a press nip with at least one other roll, said first roll having a longitudinal roll axis and comprising; a plurality of temperature sensors disposed at the same axial location along and circumferentially about said roll for sensing temperature exhibited on said first roll as said first roll is rotatingly pressing against said at least one other roll, said temperature sensors providing temperature signals representative of the temperature sensed by each of said temperature sensors, a computer comprising; a microprocessor for computing measurements of the temperature sensed by at least one of said temperature sensors from said temperature signals, a display, coupled to said computer, for providing a visual representation of said measurements of temperature.

2. A method for determining the pressure profile in a press nip comprising:

providing a first roll configured to form a press nip with at least one other roll, said first roll having a longitudinal roll axis and having a plurality of pressure sensors disposed at the same axial location along and circumferentially about said roll;

using said pressure sensors to sense the pressure exhibited against said first roll while said first roll and said at least one other roll are rotatingly pressing matter therebetween, transmitting signals from said pressure sensors representing said pressure sensed, to a computer, and displaying visual representations of said pressure sensed.

3. A method for determining the pressure profile in a press nip according to claim 2 further comprising displaying the linear locations along said first roll where the pressure is being sensed.

4. A method for determining the pressure profile in a press nip according to claim 2 further comprising displaying the angular locations along said first roll where the pressure is being sensed.

5. A system for determining the pressure profile in a press nip comprising:

a first roll configured to form a press nip with at least one other roll, said first roll having a longitudal roll axis and comprising a plurality of sensors disposed at the same axial location along and circumferentially about said roll for sensing load pressure exhibited on said first roll as said first roll is rotatingly pressing against said at least one other roll, said sensors providing pressure signals representative of the pressure sensed by each of said sensors;

a computer comprising a microprocessor for computing measurements of the pressure sensed by at least one of said sensors from said pressure signals; and a display, coupled to said computer, for providing a visual representation of said measurements of pressure.

6. The system for determining the pressure profile in a press nip according to claim 5, wherein said sensors are piezoelectric sensors.

7. The system for determining the pressure profile in a press nip according to claim 5, wherein said sensors are piezoresistive sensors.

8. The system for determining the pressure profile in a press nip according to claim 5, wherein said sensors are strain gage sensors.

9. The system for determining the pressure profile in a press nip according to claim 5, wherein said sensors are resistive sensors.

10. The system for determining the pressure profile in a press nip according to claim 5, further comprising a control system in communication with said sensors, said control system being adapted for initiating pressure correction to said first roll.

11. The system for determining the pressure profile in a press nip according to claim 5, said system further comprising a multiplexer for providing said pressure signals said computer.

12. The system for determining the pressure profile in press nip according to claim 5, said system further comprising a transmitter for providing said pressure signals to said computer.

13. The system for determining the pressure profile in press nip according to claim 12, wherein said transmitter is a wireless transmitter.

14. The system for determining the pressure profile in press nip according to claim 12, wherein said transmitter includes slip rings.

15. The system for determining the pressure profile in a press nip according to claim 5, said system further comprising a signal conditioner for providing said pressure signals to said computer.

16. The system for determining the pressure profile in a press nip according to claim 5, said display further providing a tabular display of the pressure sensed.

17. The system for determining the pressure profile in press nip according to claim 5, said display further providing a numerical display of the pressure sensed.

18. The system for determining the pressure profile in a press nip according to claim 5, said display further providing a graphical display of the pressure sensed.

19. The system for determining the pressure profile in a press nip according to claim 5, said computer further comprising a user input for requesting measurements of pressure.

20. The system for determining the pressure profile in a press nip according to claim 5, said computer further comprising an input for automatically requesting measurements of pressure at predetermined times.

21. The system for determining the pressure profile in a press nip according to claim 5, wherein at least one of said sensors is embedded beneath an outer surface of said first roll.

22. A system for determining the pressure profile in a press nip comprising:

a first roll configured to form a press nip with at least one other roll, said first roll comprising a plurality of sensors disposed about said roll in uneven radial, axial and circumferential positions for sensing load pressure exhibited on said first roll as said first roll is rotatingly pressing against said at least one other roll, said sensors providing pressure signals representative of the pressure sensed by each of said sensors;

a computer comprising a microprocessor for computing measurements of the pressure sensed by at least one of said sensors from said pressure signals; and a display, coupled to said computer, for providing a visual representation of said measurements of pressure.

23. A system for determining the pressure profile in a press nip comprising:

a first roll configured to form a press nip with at least one other roll, said first roll comprising a plurality of fiber optic sensors for sensing load pressure exhibited on said first roll as said first roll is rotatingly pressing against said at least one other roll, said sensors providing pressure signals representative of the pressure sensed by each of said sensors;

a computer comprising a microprocessor for computing measurements of the pressure sensed by at least one of said sensors from said pressure signals; and a display, coupled to said computer, for providing a visual representation of said measurements of pressure.

24. The system for determining the pressure profile in a press nip according to claim 23, wherein said at least one fiber optic sensor comprises an optical fiber mounted along the length of said first roll, and parallel to the axis of said roll.

25. The system for determining the pressure profile in a press nip according to claim 23, wherein said at least one fiber optic sensor comprises an optical fiber wrapped around said roll.

26. The system for determining the pressure profile in a press nip according to claim 23, wherein said first roll is a suction roll.

27. A system for determining the temperature profile in a press nip comprising:

a first roll configured to form a press nip with at least one other roll, said first roll comprising; a plurality of temperature sensors disposed about said roll in uneven radial, axial and circumferential positions for sensing temperature exhibited on said first roll as said first roll is rotatingly pressing against said at least one other roll, said temperature sensors providing temperature signals representative of the temperature sensed by each of said temperature sensors, a computer comprising; a microprocessor for computing measurements of the temperature sensed by at least one of said temperature sensors from said temperature signals, a display, coupled to said computer, for providing a visual representation of said measurements of temperature.

* * * * *